3,444,147
TERPOLYMERS OF ETHYLENE, A HIGHER ALPHA - OLEFIN AND METHYLENECYCLO-OCTENES
Vittorio Turba, Nazzareno Cameli, and Guido Sartori, Milan, Italy, assignors to Montecatini Edison S.p.A., Milan, Italy, a corporation of Italy
No Drawing. Filed July 5, 1966, Ser. No. 562,916
Claims priority, application Italy, July 19, 1965, 16,198/65
Int. Cl. C08f *1/28, 15/04, 37/00*
U.S. Cl. 260—80.7
14 Claims

ABSTRACT OF THE DISCLOSURE

New amorphous and vulcanizable copolymers of one or more monomers selected from ethylene and higher alpha-olefins with methylene-cyclooctenes and process for preparing the copolymers with the aid of coordinated anionic type catalysts based on vanadium compounds and aluminum or beryllium compounds.

---

The present invention relates to a new class of vulcanizable substantially linear, amorphous, high molecular weight, olefin copolymers and to a process for their preparation by means of catalysts acting with a mechanism of the coordinated anionic type.

In preceding patents and patent applications assigned to the same assignee as the present application, the preparation of linear, amorphous, unsaturated copolymers, obtained by copolymerization of one or more olefin monomers selected from ehtylene and higher olefins, with conjugated or non-conjugated, linear or cyclic dienes, or polyenes has already been described.

It has now been found according to the present invention that, by using particular catalysts acting with a mechanism of the coordinated anionic type, it is possible to prepare a new class of unsaturated, amorphous copolymers capable of giving, by vulcanization, elastomers having good mechanical characteristics. More particularly, it has been found that by using catalysts prepared from vanadium compounds and metallorganic compounds or hydrides of aluminum or beryllium it is possible to obtain high molecular weight, amorphous copolymers of one or more methylenecyclooctenes with one or more monomers selected from ethylene and higher aliphatic alpha-olefins, said copolymers consisting of macromolecules containing unsaturation and consisting essentially of monomeric units derived from each of the monomers used.

As the comonomer, for example, 5-methylene-1-cyclooctene is used.

This monomer is obtained by heating 1-methyl-1,5-cyclooctadiene in the presence of Lewis acids, such as HCl, $H_2SO_4$, $H_3PO_4$ at temperatures of 50–200° C.

Also the alkyl derivatives of 5-methylene-1-cyclooctene may be used, provided that the alkyl substituent is not located on the double bond of the unsaturation of the ring.

The olefins that can be used in the preparation of the copolymers with ethylene and methylencyclooctenes consist of aliphatic alpha-olefins having the general formula R—CH=CH$_2$ in which R is an alkyl group containing 1 to 6 carbon atoms, preferably, propylene and butene-1.

By copolymerizing, according to the present invention, a mixture of the said monomers, such as e.g., a mixture of ethylene, propylene and/or butene-1 and 5-methylene-1-cyclooctene, a crude copolymerization product is obtained consisting of macromolecules in each of which monomeric units of ethylene, propylene and/or butene-1, and of methylenecyclooctene, distributed at random are present. Each of the monomeric units coming from the polymerization of the diene still contains a free unsaturation in correspondence with the methylenic group. The cyclooctene ring does not open during polymerization. The unsaturation represents a reactive point for successive reactions to be carried out on the copolymer. It makes it possible, for instance, to vulcanize the copolymer by using mixes of the type commonly used for unsaturated rubbers. Also, the double bonds present in the macromolecules, e.g., by oxidation with ozone, can give polar groups such as, e.g., carbonyl groups, which in turn, can represent reactive groups for successive reaction, and can be utilized for improving the adhesivity of the polymer.

The copolymers of the present invention can be defined as having a substantially linear structure, substantially free of long branches. This is demonstrated by the fact that they have properties, more particularly, a viscous behaviour, practically identical with those of the known linear copolymers, e.g., of ethylene/alpha-olefin copolymers. The new copolymers, described here, have a molecular weight, determined viscosimetrically, higher than 20,000. In fact, they have an intrinsic viscosity, determined in tetra-hydronaphthalene at 135° C. or in toluene at 30° C., higher than 0.5. The polymers prior to vulcanization, are completely soluble in boiling n-heptane. Their composition can be defined as homogeneous, as demonstrated by the ease of obtaining well vulcanized products by using the techniques normally used for the vulcanization of unsaturated rubbers, particularly those with a low unsaturation content, such as butyl rubber. This also shows that the unsaturations are well distributed along the chain.

The vulcanized products thus obtained are completely insoluble in organic solvents, more particularly in aliphatic hydrocarbons and can be swollen only to a limited extent by some aromatic solvents. The vulcanized products also have very good mechanical strength and low permanent set after breaking.

The copolymers of the present invention can also be extended or plasticized, in a manner known per se, with hydrocarbon oils. Paraffinic or naphthenic oils are preferably used, but aromatic oils can also be used.

The elastomers obtained by vulcanization can be advantageously used in all the fields of application of natural and synthetic rubbers, such as, e.g., in the preparation of tires, pipes, air tubes, elastic yarns, gaskets, etc.

The copolymerization of the present invention can be carried out in an aliphatic, cycloaliphatic or aromatic hydrocarbon solvent, for example, butane, pentane, n-heptane, cyclohexane, toluene, xylene, or their mixtures. Inert halogenated solvents, such as chloroform, trichloroethylene, chlorobenzenes, tetrachloroethylene, methylene chloride, dichloroethane, etc., can also be used as solvents.

Particularly high copolymerization rates can be obtained if the copolymerization is carried out in the absence of an inert solvent, by using the monomers themselves in the liquid state, namely, e.g., in a solution of ethylene, in the mixture of aliphatic olefins and of the methylene cyclooctenes to be copolymerized, kept in the liquid state.

The catalytic systems that can be used in the process of the present invention are highly dispersed, colloidally dispersed, or completely dissolved in the hydrocarbons that can be used as the copolymerization medium, such as aliphatic, cycloaliphatic, or aromatic hydrocarbons, and are prepared from metallorganic compounds or hydrides of aluminum or beryllium, and of vanadium compounds.

The metallorganic compounds or hydrides employable in the preparation of the catalyst are preferably selected from the group consisting of: beryllium dialkyls, beryllium alkyl halides, beryllium diaryls, aluminum trialkyls, aluminum dialkylmonohalides, aluminum monoalkyl dihalides, aluminum alkyl-sesquihalides, aluminum alkenyls, aluminum alkylenes, aluminum cycloalkyls, aluminum cycloalkyl alkyls, aluminum aryls, aluminum alkyl aryls, aluminum hydrides, aluminum alkyl hydrides, aluminum halogen hydrides,, complexes of the aforementioned metallorganic compounds with Lewis bases, preferably weak (heat of complexation with the metallorganic compound of less than 12,000 cal./mole). It is also possible to use metallorganic compounds in which the metal is bound through main valences not only to carbon and/or halogen atoms but also to oxygen atoms bound to an organic group, such as, e.g., aluminum dialkyl alkoxides and aluminum alkyl alkoxy halides.

As non-restrictive specific examples of these compounds we may mention: beryllium dimethyl, beryllium methyl chloride, beryllium diethyl, aluminum triethyl, aluminum triisobutyl, aluminum trihexyl, aluminum diethyl monochloride, aluminum diethyl monoiodide, aluminum diethyl monofluoride, aluminum diisobutyl monochloride, aluminum monoethyl dichloride, aluminum ethyl sesquichloride, aluminum butenyl diethyl, aluminum isohexenyl-diethyl, 1-methyl-1,4-di-(diisobutyl aluminum) butane, aluminum tri(dimethyl cyclopentyl methyl), aluminum triphenyl, aluminum tritolyl, di(cyclopentyl methyl) aluminum monochloride, diphenyl aluminum monochloride, diphenyl aluminum monochloride, aluminum diisobutyl monochloride complexed with anisol, aluminum monochloro monoethyl monoethoxide, aluminum diethyl propoxide, aluminum diethyl amyloxide, aluminum monochloro monopropyl monopropoxide, aluminum diisobutylhydride, and aluminum chloro hydride.

Vanadium compounds soluble in the hydrocarbons employable as the copolymerization medium are preferably used in the preparation of the catalyst. Halides and oxyhalides such as, e.g., $VCl_4$, $VOCl_3$, $VBr_4$ and compounds in which at least one of the valences of the metal is saturated by a hetero atom, more particularly oxygen and nitrogen, bound to an organic group, such as, vanadium triacetylacetonate and tribenzoylacetonate, vanadyl diacetylacetonate, halogen acetylacetonates, trialcoholoates and halogen alcoholates, tetrahydrofuranates, etherates, aminates, pyridinates and quinolinates of vanadium tri- and tetra-chloride and of vanadyl trichloride are therefore used. Vanadium compounds insoluble in hydrocarbons, selected from organic salts such as, vanadium triacetate, tribenzoate, tristearate, or inorganic compounds such as $VO_2Cl$, can also be used. In practice, it has been found that in order to obtain the best results it is necessary to operate in the presence of catalytic systems containing halogen atoms in which at least one of the components contains at least one halogen atom.

The copolymerization process of the present invention can be carried out at temperatures between $-80°$ C. and $+125°$ C.

If catalysts prepared from a vanadium compound in the presence of aluminum alkyl halides are used, in order to obtain high productions of copolymer per weight unit of catalyst used, both the preparation of the catalyst and the copolymerization should be carried out at temperatures between $0°$ C. and $-80°$ C., preferably between $-10°$ and $-50°$ C. By operating under these conditions the catlysts have an activity much higher than that of the same catalytic systems at higher temperatures. Moreover by operating in the field of the aforementioned low temperatures, the activity of the catalyst remains practically unaltered with time.

If catalysts prepared from an aluminum dialkylmonohalide or a berylliumalkylhalide and from vanadium triacetylacetonate, vanadyl trialkoxides or vanadyl halogen alkoxides are used at temperatures between $0°$ C. and $125°$ C., in order to obtain a high rate of production of copolymer, it is best to operate in the presence of complexing agents selected from ethers, thioethers, trisubstituted tertiary amines or phosphines containing at least one branched alkyl group or an aromatic nucleus. The complexing agent can be an ether of the formula RYR' wherein Y is oxygen or sulfur and R and R' are a linear or branchel alkyl group containing 1 to 14 carbon atoms or an aromatic nucleus containing 6 to 14 carbon atoms, at least one of R and R' being a branched alkyl group or an aromatic nucleus. The complexing agent can also be a tertiary amine of the formula

in which R, R' and R'', each represents an alkyl group containing 1 to 14 carbon atoms or an aromatic nucleus containing 6 to 14 carbon atoms, at least one of R, R' and R'' being an aromatic nucleus. The complexing agent can also be a teritary phosphine of the formula

in which R, R' and R'', each represents an alkyl radical containing 1 to 14 carbon atoms or an aromatic nucleus containing 6 to 14 carbon atoms, at least one of R, R' and R'' being an aromatic nucleus.

The amount of complexing agent is preferably between 0.05 and 1 mole per mole of aluminum alkyl halide.

The activity of the catalysts used in the process varies with the molar ratio between the compounds used in the preparation of the catalyst. It has been found that, by using, e.g., aluminum trialkyls or beryllium dialkyls and vanadium halides or oxyhalides, it is convenient to use catalysts in which the molar ratio between aluminum trialkyl or beryllium dialkyl and vanadium compound is between 1 and 5, preferably between 2 and 4. On the other hand, by using aluminum diethyl monochloride, $Al(C_2H_5)_2Cl$, and vanadium triacetylacetonate, $VAc_3$, the best results are obtained with an $Al(C_2H_5)_2$ $Cl/VAc_3$ molar ratio between 2 and 20, preferably between 4 and 10.

In order to obtain copolymers having a highly homogeneous composition, the ratio between the concentrations of the monomers to be copolymerized, present in the reacting liquid phase, should preferably be kept constant, or at least as constant as possible, during the copolymerization. For this purpose, it is convenient to carry out the copolymerization continuously, by continuously feeding and discharging a mixture of monomers with constant composition and by operating with high feed and discharge rates.

By varying the composition of the monomer mixture, the composition of the copolymers can be varied within wide limits. If amorphous copolymers of methylenecyclooctene with ethylene and propylene are to be obtained, an ethylene/propylene molar ratio lower than, or at most equal to, 1:4, should be kept in the liquid phase, corresponding to an ethylene/propylene molar ratio in the gaseous phase lower than, or at most equal to, 1:1, under normal conditions. Molar ratios between 1:200 and 1:4 in the liquid phase are usually preferred. If butene-1 is used instead of propylene, the ethylene/butene-1 molar ratio in the liquid phase must be lower than, or at most equal to, 1:20, corresponding to a molar ratio between ethylene and butene-1 in the gaseous phase lower than, or at most equal to, 1:1.5, under normal conditions. Molar ratios in the liquid phase between 1:1,000 and 1:20 are normally preferred.

By operating under these conditions amorphous copolymers containing less than about 75% by mols of ethylene are obtained. At molar ethylene contents above about 75%, the copolymer shows a polyethylenic type crystallinity.

The lower limit of the ethylene content is not critical. It is preferable, however, that the copolymers contain at least 5% by mols of ethylene. The ethylene content, in general, may be between 40 and 60% by mols.

The alpha-olefin content can vary from a minimum of 5% by mols, to a maximum of 95% by mols, and is preferably between 40 and 60%.

The polyene content in the copolymer may be between 0.1 and 20% by mols, preferably between 1 and 5% by mols. The upper limit of the polyene content can be raised but, primarily for economical reasons, it is not convenient to introduce into the copolymer a polyene content higher than 20% by mols.

The following examples serve to better illustrate the invention, without however, limiting its scope.

EXAMPLE 1

The reaction apparatus consists of a glass cylinder having a diameter of 5.5 cm. and a capacity of 700 cc., provided with a stirrer and tubes for the inlet and outlet of gases. The gas inlet tube reaches the bottom of the vessel and ends with a porous diaphragm having a diameter of 3.5 cm.

200 cc. of anhydrous n-heptane and 15 cc. of 5-methylene-1-cyclooctene are introduced into the reactor kept at −20° C. and purged with nitrogen. Agitation is started and through the gas inlet tube a gaseous ethylene-propylene mixture in the molar ratio of 1:2 is introduced with a rate of 200 normal liters per hour (N l./h.).

In a 100 cc. flask, kept at −20° C., the catalyst is prepared by reacting 1 millimol of vanadium tetrachloride and 2.5 millimols of aluminum ethylsesquichloride ($Al_2Et_3Cl_3$) under a nitrogen atmosphere in 40 cc. of anhydrous n-heptane.

The catalyst thus formed is siphoned under nitrogen pressure into the reactor. The ethylene-propylene mixture is continuously circulated at the flow rate of 200 N l./h.

After 60 minutes the reaction is stopped by adding 20 cc. of methanol containing 0.1 g. of N-phenyl-beta-naphthylamine. The product is purified in a separating funnel by repeated treatments with diluted hydrochloric acid and then with water, and finally coagulated with acetone.

After vacuum drying, 7 g. of a solid product, amorphous by X-ray examination, having the appearance of a non-vulcanized elastomer, completely soluble in boiling n-heptane are obtained. The analysis by infrared spectrography shows the presence of a band at about 11.6 microns, attributable to the group $>C=CH_2$. The ethylene/propylene molar ratio is about 1:1. The diene content is about 4% by weight.

100 parts by weight of the ethylene-propylene-methylene-cyclooctene terpolymer obtained are mixed in a laboratory roll mixer with 50 parts of carbon black HAF, one part of N-phenyl-beta-naphthylamine, 2 parts of sulfur, 5 parts of zinc oxide, 1 part of tetramethyl-thiuram disulfide, and 0.5 parts of mercapto-benzothiazole. The mixture is vulcanized in a press at 150° C. for 60 minutes. A vulcanized lamina having the following characteristics is obtained:

Tensile strength _____ kg./cm.$^2$__ 218
Elongation at break _____ percent__ 580
Modulus at 300% _____ kg./cm.$^2$__ 91

EXAMPLE 2

200 cc. of n-heptane and 20 cc. of 5-methylene-1-cyclooctene are introduced into the same reaction apparatus as described in Example 1. Agitation is started and through the gas inlet tube an ethylene-propylene mixture in the molar ratio of 1:2 is introduced and circulated at the rate of 200 N l./h.

In a 100 cc. flask the catalyst is pre-formed, by operating at −20° C. under a nitrogen atmosphere, by reacting 1 millimol of vanadium tetrachloride and 5 millimols of aluminum diethylmonochloride in 30 cc. of anhydrous n-heptane.

The catalyst thus formed is siphoned into the reactor by means of nitrogen pressure. The ethylene-propylene mixture is continuously fed and discharged at a rate of 200 N l./h.

After 60 minutes the reaction is stopped by addition of 10 cc. of methanol containing 0.1 g. of N-phenyl-beta-naphthylamine. The product is purified and isolated as described in Example 1.

After vacuum drying, 7.5 g. of a solid product which is amorphous by X-ray examination, looks like a non-vulcanized elastomer, and is completely soluble in boiling n-heptane is obtained. The examination by infrared spectrography shows the presence of a band at about 11.5 microns, attributable to the presence of groups $>C=CH_2$. The ethylene/propylene molar ratio is about 1:1. The diene content is about 5% by weight.

The terpolymer is vulcanized with the same mix and the same modalities as in Example 1. A vulcanized lamina having the following characteristics is obtained:

Tensile strength _____ kg./cm.$^2$__ 210
Elongation at break _____ percent__ 530
Modulus at 300% _____ kg./cm.$^2$__ 114

EXAMPLE 3

200 cc. of n-heptane and 20 cc. of 5-methylene-1-cyclooctene are introduced into the same reaction apparatus as described in Example 1. Agitation is started and through the gas inlet tube an ethylene-propylene mixture in the molar ratio of 1:3 is introduced and circulated at the rate of 200 N l./h.

In a 100 cc. flask the catalyst is pre-formed by operating at −20° C. under a nitrogen atmosphere, by reacting 1 millimol of vanadium oxytrichloride and 2.5 millimols of aluminum ethyl sesquichloride ($Al_2Et_3Cl_3$) in 30 cc. of anhydrous n-heptane.

The catalyst thus pre-formed is siphoned into the reactor by means of a nitrogen pressure. The ethylene-propylene mixture is continuously fed and discharged at the rate of 200 N l./h.

After 60 minutes the reaction is stopped by addition of 10 cc. of methanol containing 0.1 g. of N-phenyl-beta-naphthylamine. The product is purified and isolated as described in Example 1.

After vacuum drying, 8 g. of a solid product which is amorphous by X-ray examination, looks like a non-vulcanized elastomer, and is completely soluble in n-heptane are obtained. The examination by infrared spectrography shows the presence of a band at about 11.5 microns, attributable to the presence of $>C=CH_2$ groups. The ethylene-propylene molar ratio is about 1:1. The diene content is about 5% by weight.

The terpolymer is vulcanized with the same mix and the same modalities of Example 1. A vulcanized lamina having the following characteristics is obtained:

Tensile strength _____ kg./cm.$^2$__ 217
Elongation at break _____ percent__ 520
Modulus at 300% _____ kg./cm.$^2$__ 104

EXAMPLE 4

200 cc. of anhydrous n-heptane and 20 cc. of 5-methylene-1-cyclooctene are introduced into the same reaction apparatus as described in Example 1, kept at −20° C. Agitation is started and through the gas inlet tube an ethylene/propylene mixture in the molar ratio of 1:3 is introduced and circulated at the flow rate of 200 N l./h.

In a 100 cc. flask the catalyst is pre-formed by operating at −20° C. under nitrogen, by reacting 1 millimol of $VOCl_3$ and 5 millimols of aluminum diethyl monochloride in 30 cc. of anhydrous n-heptane.

The catalyst thus formed is siphoned into the reactor by means of nitrogen pressure. The ethylene-propylene mixture is continuously fed and discharged at the flow rate of 200 N l./h.

After 60 minutes the reaction is stopped by addition of 10 cc. of methanol containing 0.1 g. of N-phenyl-beta-naphthylamine. The product is purified and isolated as described in Example 1.

After vacuum drying, 11 g. of a solid product which is amorphous by X-ray examination, looks like a non-vulcanized elastomer and is completely soluble in boiling n-heptane are obtained. The examination by infrared spectrography shows the presence of a band of about 11.5 microns, attributable to the presence of $>C=CH_2$ groups. The ethylene-propylene molar ratio is about 1:1. The diene content is about 6% by weight.

The terpolymer is vulcanized with the same mix and the same modalities as in Example 1. A vulcanized lamina having the following characteristics is obtained:

Tensile strength _____ kg./cm.$^2$__ 190
Elongation at break _____ percent__ 470
Modulus at 300% _____ kg./cm.$^2$__ 124

EXAMPLE 5

200 cc. of n-heptane and 20 cc. of 5-methylene-1-cyclooctene are introduced into the same reaction apparatus as described in Example 1 kept at —10° C. Agitation is started and through the gas inlet tube an ethylene-butene-1 mixture in the molar ratio of 1:3 is introduced and circulated at the rate of 200 N l./h.

In a 100 cc. flask the catalyst is pre-formed, by operating at —10° C. under a nitrogen atmosphere, by reacting 1 millimol of vanadium tetrachloride and 5 millimols of aluminum diethylmonochlororide in 30 cc. of anhydrous n-heptane.

The catalyst thus formed is siphoned into the reactor by means of nitrogen pressure. The ethylene-butene mixture is continuously fed and discharged at a rate of 400 N l./h.

After 60 minutes the reaction is stopped by addition of 10 cc. of methanol containing 0.1 g. of N-phenyl-beta-naphthylamine. The product is purified and isolated as described in Example 1.

After vacuum drying, 5 g. of a solid product which is amorphous by X-ray examination, looks like a non-vulcanized elastomer, and is completely soluble in boiling n-heptane is obtained. The examination by infrared spectrography shows the presence of a band at about 11:5 microns, attributable to the presence of groups $>C=CH_2$. The ethylene/butene molar ratio is about 1:1. The diene content is about 5% by weight.

The terpolymer is vulcanized with the same mix and the same modalities as in Example 1. A vulcanized lamina having the following characteristics is obtained:

Tensile strength _____ kg./cm.$^2$__ 185
Elongation at break _____ percent__ 420
Modulus at 300% _____ kg./cm.$^2$__ 130

EXAMPLE 6

200 cc. of n-heptane and 20 cc. of 5-methylene-1-cyclooctene are introduced into the same reaction apparatus as described in Example 1. Agitation is started and through the gas inlet tube an ethylene-propylene mixture in the molar ratio of 1:2 is introduced and circulated at the rate of 200 N l./h.

In a 100 cc. flask the catalyst is pre-formed by operating at —20° C. under a nitrogen atmosphere, by reacting 1 millimol of vanadium tetrachloride and 5 millimols of beryllium diethyl in 30 cc. of anhydrous n-heptane.

The catalyst thus preformed is siphoned into the reactor by means of a nitrogen pressure. The ethylene-propylene mixture is continuously fed and discharged at the rate of 200 N l./h.

After 60 minutes the reaction is stopped by addition of 10 cc. of methanol containing 0.1 g. of N-phenyl-beta-naphthylamine. The product is purified and isolated as described in Example 1.

After vacuum drying, 7.5 g. of a solid product which is amorphous by X-ray examination, looks like a non-vulcanized elastomer, and is completely soluble in n-heptane are obtained. The examination by infrared spectrography shows the presence of a band at about 11.5 microns, attributable to the presence of $>C=CH_2$ groups. The ethylene-propylene molar ratio is about 1:1.

The diene content is about 5% by weight.

As will be apparent, various changes in details may be made in the practice of this invention without departing from the spirit thereof. It is intended, therefore, to include in the scope of the appended claims, all such modifications in details as will be obvious to those skilled in the art from the description and working examples given herein.

What is claimed is:
1. Substantially linear, amorphous, unsaturated, high molecular weight copolymers selected from the group consisting of (A) such copolymers of at least one methylenecyclooctene with ethylene; and (B) such copolymers of at least one methylenecyclooctene with ethylene and aliphatic alpha-olefins having the general formula R—CH=CH$_2$ in which R is an alkyl group containing 1 to 6 carbon atoms, said copolymers consisting essentially of macromolecules having polymerized units of each of the starting monomers randomly distributed therein, and containing from about 5% to about 75% ethylene by mols; from about 0.1% to about 20% by mols of methylenecyclooctene; and the balance, if any, aliphatic alpha-olefin.

2. Copolymers according to claim 1, consisting essentially of macromolecules containing polymerized units of ethylene, of at least one aliphatic alpha-olefin having the general formula R—CH=CH$_2$, in which R is an alkyl group containing 1 to 6 carbon atoms, and of 5-methylene-1-cyclooctene.

3. Copolymers according to claim 1, consisting essentially of macromolecules containing units of ethylene, propylene and 5-methylene-1-cyclooctene.

4. Process for the preparation of the copolymers according to claim 1, characterized in that a mixture of the monomers recited in claim 1 is polymerized in the presence of a catalyst obtained from:
    (a) vanadium compounds, and
    (b) a compound selected from the group consisting of metall-organic compounds and hydrides of a metal selected from the group consisting of beryllium and aluminum
at a temperature between —80° and +125° C.

5. A process according to claim 4, characterized in that at least one of the catalytic components contains at least one halogen atom.

6. A process according to claim 4, characterized in that the catalyst is obtained from hydrocarbon-soluble vanadium compounds.

7. A process according to claim 4, characterized in that the polymerization is carried out at temperatures between 0° and —80° C.

8. A process according to claim 4, characterized in that the polymerization is carried out in the presence of the monomers in the liquid state, in the substantial absence of an inert solvent.

9. A process according to claim 4, characterized in that the polymerization is carried out in an inert solvent.

10. A process for the preparation of a copolymer of at least one methylenecyclooctene with ethylene and propylene according to claim 4, characterized in that the molar ratio between ethylene and propylene in the liquid phase is not more than 1:4.

11. A process for the preparation of a copolymer of at least one methylenecyclooctene with ethylene and butene-1 according to claim 4, characterized in that the ethylene/butene-1 molar ratio in the liquid phase is not more than 1:20.

12. A process according to claim 4, characterized in that a catalyst obtained from a vanadium compound selected from the group consisting of vanadium triacetylacetonate, vanadyl trialkoxides and vanadyl halogen alkoxides, and from a compound selected from aluminum alkyl halides and beryllium alkylhalides compound is used at temperatures between 0° and 125° C. in the presence of a complexing agent.

13. Elastomers obtained by vulcanization of the copolymers according to claim 1.

14. Manufactured articles obtained by shaping a mass containing an elastomer according to claim 13.

References Cited

UNITED STATES PATENTS 3,281,398   10/1966   Natta _____ 260—88.2

JOSEPH L. SCHOFER, *Primary Examiner.*

R. S. BENJAMIN, *Assistant Examiner.*

U.S. Cl. X.R.

260—80.78, 82.1, 88.2, 666